(No Model.)
J. F. BALDWIN.
REVERSING MECHANISM.
No. 248,271. Patented Oct. 18, 1881.
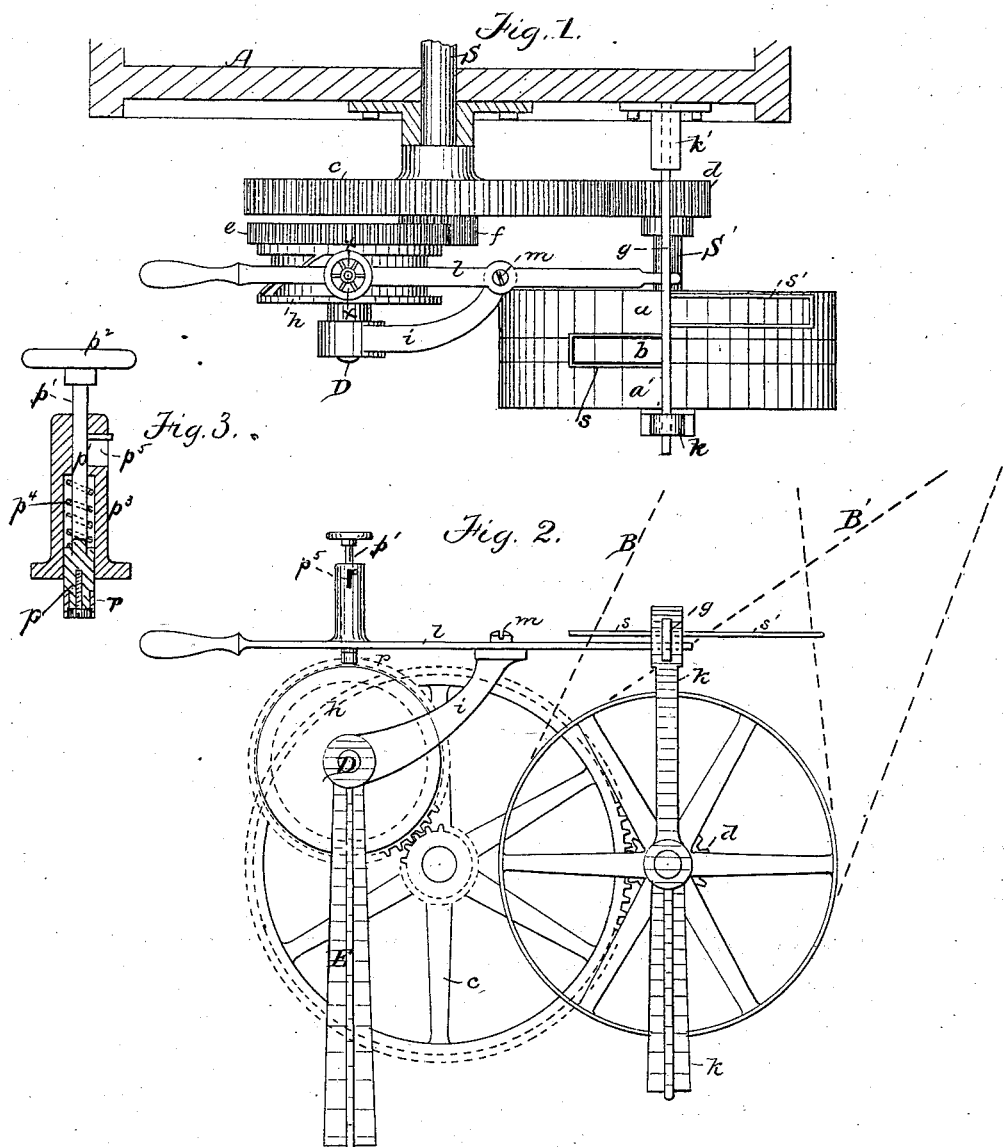
Witnesses.
Inventor.

UNITED STATES PATENT OFFICE.

JOSEPH F. BALDWIN, OF CAMBRIDGE, MASSACHUSETTS.

REVERSING MECHANISM.

SPECIFICATION forming part of Letters Patent No. 248,271, dated October 18, 1881.

Application filed December 18, 1880. (No model.)

*To all whom it may concern:*

Be it known that I, JOSEPH F. BALDWIN, of Cambridge, in the county of Middlesex and State of Massachusetts, have invented certain Improvements in Reversing Mechanism, of which the following is a specification.

This invention has for its object to provide simple and effective mechanism for automatically reversing the rotation of a washing-machine cylinder or other rotary body, so that the same shall rotate alternately in opposite directions instead of continuously in the same direction.

The invention consists, as a whole, in the combination of a sliding belt-shipper, a pivoted operating-lever engaged therewith, and a wheel positively rotated by suitable connections with a prime motor, and provided with parallel grooves, each adapted to receive a projection on the operating-lever and to move said projection laterally into the other groove when the wheel reaches a given point in its rotation, thereby moving the operating-lever and causing the latter to operate the shipper which changes the driving-belts running on fast and loose pulleys in the usual manner to reverse the rotation of the cylinder.

The invention also consists in certain details of construction, all of which I will now proceed to describe and claim.

Of the accompanying drawings, forming a part of this specification, Figure 1 represents a top view of my improved reversing mechanism. Fig. 2 represents an end view of the same. Fig. 3 represents a section on line $x\ x$, Fig. 1. Fig. 4 represents a perspective view of the grooved wheel. Figs. 5 and 6 represent views of a portion of the periphery of the grooved wheel developed as a plane surface.

The same letters of reference indicate the same parts in all the figures.

In the drawings, A represents a fixed outer cylinder or casing, in which is journaled the rotary inner cylinder of a washing-machine, said inner cylinder (not shown in the drawings) being rotated by the shaft S, to which power is applied from a counter-shaft, S', through meshing-gears $c\ d$, attached, respectively, to the shafts S and S'.

The counter-shaft S' is provided with two loose pulleys, $a\ a'$, and an intermediate fast pulley, $b$. On these pulleys run two belts, B B', (shown in dotted lines in Fig. 2,) one open and the other crossed.

$g$ represents a belt-shipper, having belt guides or yokes $s\ s'$. This shipper is supported and adapted to slide in suitable bearings in a fixed arm, $k$, and in a sleeve, $k'$, attached to the cylinder A, so as to ship each of the belts B B' from one pulley to another.

$l$ represents a lever pivoted at $m$ to a fixed arm, $i$, and engaged at one end with the shipper $g$ by entering a slot in said shipper.

$h$ represents a disk or wheel, rigidly attached to a shaft, D, which is journaled in a fixed arm, E, said shaft being substantially parallel with the shafts S S'. $e$ represents a gear also rigidly attached to the shaft D by the side of the wheel $h$, and meshing with a gear, $f$, on the outer end of the shaft S', so that the shaft C and its wheel $h$ will be rotated by the shaft S.

The wheel $h$ is provided in its periphery with two parallel grooves, $h'\ h^2$. These grooves terminate in curved walls or guides $h^3$, adjoining which are openings $o\ o$ in the wall $w$, between the grooves $h'\ h^2$.

The lever $l$ is provided with a projection, $p$, which is adapted to enter either of the grooves of the wheel $h$. The walls or guides $h^3$ are so formed that each guide is adapted, when it comes in contact with the projection $p$ in the rotation of the wheel $h$, to move said projection laterally through one of the openings $o$ into the other groove, thus giving the lever $l$ a sufficient movement on its pivot to cause the lever to operate the belt-shipper $g$, and thereby shift one of the belts from one of the loose pulleys to the fast pulley and the other belt from the fast pulley to the other loose pulley, as will be readily understood, thereby reversing the rotation of the shafts S', S, and D. When the reverse movement of the wheel $h$ brings the other wall or guide $h^3$ to the projection $p$ said projection is moved laterally into the other groove, and another reversal is effected, and so on, the walls or guides $h^3\ h^3$ acting alternately in moving the projection $p$, the lever $l$, and the shipper $g$. In each groove there is a space, $h^4$, between the opening $o$, through which the projection $p$ enters the groove and the wall $h^3$. These spaces I term "rests," their object being to permit the wheel to have a brief continued movement, caused by the momentum of the rotating parts of the described mechanism after the shifting of the belts and before the reverse movement commences.

The wall $w$ is beveled at $w'$ for the purpose of preventing injury to the projection $p$ and to the end of the wall after the reverse movement of the wheel $h$ commences, in case said projection is moved toward the opening $o$ by any lateral pressure exerted on the belt-shipper by the belt. It may sometimes happen that the projection $p$ will be moved laterally to such an extent that were it not for the beveled portions $w'$, it would collide more or less violently with the end of the wall $w$.

The projection $p$ is preferably in the form of a plunger having a stem, $p'$, and handle $p^2$, and working in a socket, $p^3$, on the lever $l$, and pressed down by a spring, $p^4$. This construction enables the projection to be raised and disengaged from the grooves of the wheel $h$, as shown in Fig. 2.

The socket $p^3$ is provided with an angular slot, $p^5$, adapted to support in its upper part a pin on the stem $p'$ and hold the projection in an elevated position.

$r$ represents a friction-roller on the lower portion of the projection $p$. By making the projection $p$ movable the lever $l$ can be readily disengaged, so that the belts can be readily set on the loose pulleys. When the projection $p$ is raised the lever should be locked to prevent accidental movement.

The described reversing mechanism is simple and effective and not liable to get out of order. The grooves $h'$ $h^2$ hold the projection $p$, so that no movement of the same can take place by accident.

I claim—

1. The combination of the sliding belt-shipper $g$, the pivoted lever $l$, engaged with the shipper, and the positively-rotated disk or wheel $h$, having parallel peripheral grooves $h'$ $h^2$, each adapted to receive a projection, $p$, on the lever $l$, and each terminating in a guide or wall, $h^3$, adapted to guide the projection $p$ laterally into the other groove, and thereby move the lever $l$ and shipper $g$, as set forth.

2. The combination, with the shipper-operating lever $l$, having the projection $p$, the disk or wheel $h$, having the grooves $h'$ $h^2$, guides or walls $h^3$ $h^3$, and rests $h^4$ $h^4$, whereby space is afforded for a brief continuation of the movement of the wheel $h$ after the projection $p$ enters each groove, as set forth.

3. The combination of the shipper-operating lever $l$, having the projection $p$, and the disk or wheel $h$, having the grooves $h'$ $h^2$, the guides $h^3$ $h^3$, and the interposed wall $w$, separating the grooves, and provided with beveled ends $w'$, as and for the purpose set forth.

4. The combination, with the grooved wheel $h$, of the shipper-operating lever $l$, having the movable projection $p$, whereby said lever may be engaged with or disengaged from the wheel $h$, as set forth.

In testimony whereof I have signed my name to this specification, in the presence of two subscribing witnesses, this 14th day of December, A. D. 1880.

JOSEPH F. BALDWIN.

Witnesses:
   C. F. BROWN,
   W. CLIMO.